United States Patent
Tanahashi et al.

(10) Patent No.: US 9,687,938 B2
(45) Date of Patent: Jun. 27, 2017

(54) LASER MACHINING APPARATUS

(71) Applicant: Mitsubishi Electric Corporation, Chiyoda-ku, Tokyo (JP)

(72) Inventors: Kunihiro Tanahashi, Aichi (JP); Kenji Saruta, Aichi (JP); Yuuki Tamura, Aichi (JP); Komaki Sasaki, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 24 days.

(21) Appl. No.: 14/768,237

(22) PCT Filed: Sep. 3, 2014

(86) PCT No.: PCT/JP2014/073246
§ 371 (c)(1),
(2) Date: Aug. 17, 2015

(87) PCT Pub. No.: WO2016/035178
PCT Pub. Date: Mar. 10, 2016

(65) Prior Publication Data
US 2016/0250718 A1 Sep. 1, 2016

(51) Int. Cl.
*B23K 26/08* (2014.01)
*B23K 26/10* (2006.01)
(Continued)

(52) U.S. Cl.
CPC .......... *B23K 26/359* (2015.10); *B23K 26/082* (2015.10); *B23K 26/10* (2013.01)

(58) Field of Classification Search
CPC ..... B23K 26/082; B23K 26/10; B23K 26/359
See application file for complete search history.

(56) References Cited

U.S. PATENT DOCUMENTS 4,973,819 A * 11/1990 Thatcher ................ B23K 26/10
                                                  219/121.63
5,304,773 A *  4/1994 Kilian ................... B23K 26/04
                                                  219/121.78
(Continued)

FOREIGN PATENT DOCUMENTS

DE         19620391 A1 * 11/1997
EP           159723 A2 * 10/1985
(Continued)

OTHER PUBLICATIONS

Machine translation of Japan Patent document No. 11-347,861, Nov. 2016.*

(Continued)

*Primary Examiner* — Geoffrey S Evans
(74) *Attorney, Agent, or Firm* — Sughrue Mion, PLLC; Richard C. Turner

(57) ABSTRACT

A laser machining apparatus includes: an optical-scanning laser machining device that includes a machining head, which moves in a first direction and a second direction intersecting the first direction and emits laser light on a workpiece to machine the workpiece; a first marking device that is provided on one side of the optical-scanning laser machining device in the first direction and puts a mark on the workpiece; a second marking device that is provided on another side of the optical-scanning laser machining device in the first direction and puts a mark on the workpiece; and a pallet on which the workpiece to be machined by the optical-scanning laser machining device is loaded and which moves in the first direction between the first marking device and the second marking device.

6 Claims, 9 Drawing Sheets

(51) Int. Cl.
  *B23K 26/359* (2014.01)
  *B23K 26/082* (2014.01)

(56) References Cited

U.S. PATENT DOCUMENTS

| | | | |
|---|---|---|---|
| 5,444,212 A | 8/1995 | MacNaughton et al. | |
| 5,500,507 A * | 3/1996 | Yoshiaki | B23K 37/047 219/121.67 |
| 5,854,460 A * | 12/1998 | Graf | B23K 26/0884 219/121.67 |
| 6,126,890 A * | 10/2000 | Anderson | B23K 37/047 266/274 |
| 2008/0197118 A1* | 8/2008 | Gattiglio | B23K 26/08 219/121.63 |
| 2008/0309747 A1* | 12/2008 | McCoin | B44C 1/02 347/264 |
| 2009/0107206 A1 | 4/2009 | Thonig et al. | |
| 2011/0068089 A1* | 3/2011 | Kettner-Reich | B23K 26/10 219/121.67 |
| 2011/0150371 A1 | 6/2011 | Bosman et al. | |

FOREIGN PATENT DOCUMENTS

| | | | |
|---|---|---|---|
| JP | 3-138092 A | * | 6/1991 |
| JP | 06-226475 A | * | 8/1994 |
| JP | 6-304773 A | | 11/1994 |
| JP | 10-193150 A | * | 7/1998 |
| JP | 11-114741 A | | 4/1999 |
| JP | 11-277285 A | | 10/1999 |
| JP | 11-347861 A | * | 12/1999 |
| JP | 11-347861 A | | 12/1999 |
| JP | 2003-340577 A | * | 12/2003 |
| JP | 2009-101416 A | | 5/2009 |
| JP | 2013-215785 A | | 10/2013 |
| JP | 2013-215825 A | | 10/2013 |

OTHER PUBLICATIONS

Machine translation or Japan Patent document No. 2003-340,577, Nov. 2016.*
International Search Report for PCT/JP2014/073246 dated Nov. 25, 2014. [PCT/ISA/210].
Written Opinion of the International Search Authority for PCT/JP2014/073246 dated Nov. 25, 2014. [PCT/ISA/237].

* cited by examiner

LASER MACHINING APPARATUS

CROSS REFERENCE TO RELATED APPLICATIONS

This application is a National Stage of International Application No. PCT/JP2014/073246 filed Sep. 3, 2014, the contents of all of which is incorporated herein by reference in its entirety.

FIELD

The present invention relates to a laser machining apparatus including an optical-scanning laser machining device.

BACKGROUND

There are known machining apparatuses that use lasers. For example, Patent Literature 1 describes an apparatus that performs, by causing workpieces to move in a circulatory motion, marking on one of the workpieces while the other one is being machined. Patent Literature 2 describes a laser machining device that can perform combined machining by including gantries having different functions on the same machining table.

CITATION LIST

Patent Literatures

Patent Literature 1: Japanese Patent Application Laid-open No. 2009-101416
Patent Literature 2: Japanese Patent Application Laid-open No. H11-347861

SUMMARY

Technical Problem

With the technique described in Patent Literature 1, it is possible to improve the productivity by performing marking at a processing position when a workpiece is being machined at a machining position. However, because it is a configuration in which workpieces are caused to move in a circulatory motion, a very large installation space is required. With the technique described in Patent Literature 2, cutting and marking can be performed simultaneously; however, because gantries are present on the same route, there are limitations and restrictions so that these gantries do not interfere with each other, and thus the cutting and marking cannot be performed independently. Therefore, with the technique described in Patent Literature 2, the productivity thereof is lowered.

The present invention has been achieved to solve the above problems, and an object of the present invention is to suppress an increase in the installation space of a laser machining apparatus while improving the productivity thereof.

Solution to Problem

In order to solve the above problems and achieve the object, a laser machining apparatus of an aspect of the present invention includes: an optical-scanning laser machining device that includes a machining head, which moves in a first direction and a second direction intersecting the first direction and emits laser light on a workpiece to machine the workpiece; a first marking device that is provided on one side of the optical-scanning laser machining device in the first direction and puts a mark on the workpiece; a second marking device that is provided on another side of the optical-scanning laser machining device in the first direction and puts a mark on the workpiece; and a pallet on which the workpiece to be machined by the optical-scanning laser machining device is loaded and which moves in the first direction between the first marking device and the second marking device.

Advantageous Effects of Invention

According to the present invention, it is possible to suppress an increase in the installation space of a laser machining apparatus while improving the productivity thereof.

DESCRIPTION OF EMBODIMENTS

A laser machining apparatus according to exemplary embodiments of the present invention will be explained below in detail with reference to the accompanying drawings. The present invention is not limited to the embodiments described below.

First Embodiment

Figure 1:
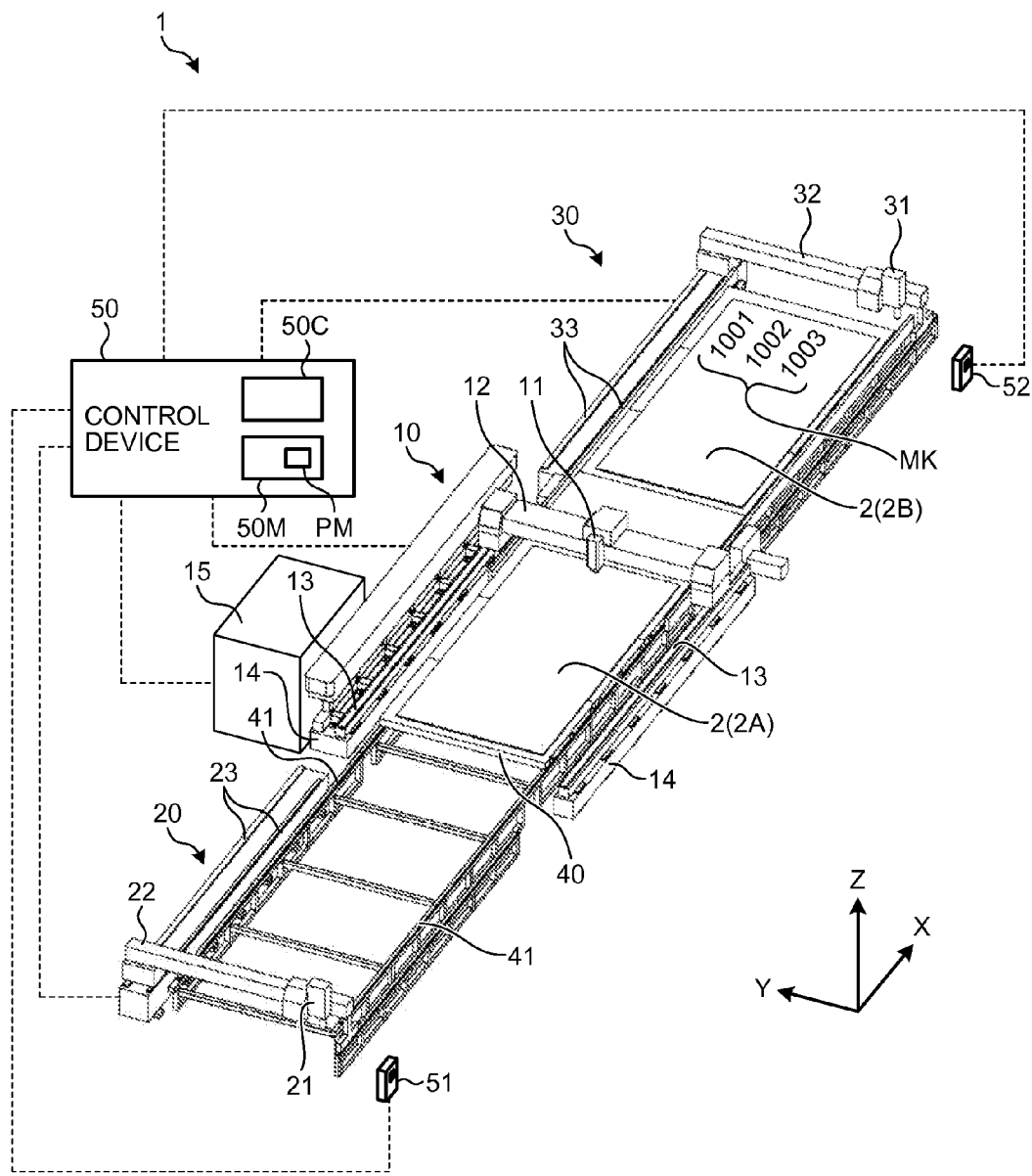
FIG. 1 is a perspective view illustrating a laser machining apparatus according to a first embodiment.

FIG. 1 is a perspective view illustrating a laser machining apparatus according to a first embodiment. A laser machining apparatus 1 according to the first embodiment includes an optical-scanning laser machining device 10 that includes a machining head 11 that moves in a first direction and a second direction intersecting the first direction and radiates laser light on a workpiece 2 to machine the workpiece 2, a first marking device 20 that is provided on one side of the optical-scanning laser machining device 10 in the first direction and puts a mark on the workpiece 2, a second marking device 30 that is provided on the other side of the optical-scanning laser machining device 10 in the first direction and puts a mark on the workpiece 2, and a pallet 40 on which the workpiece 2 to be machined by the optical-scanning laser machining device 10 is loaded and moves in the first direction between the first marking device 20 and the second marking device 30. In the first embodiment, the laser machining apparatus 1 further includes a pair of pallet transporting rails 41, 41 that guides the pallet 40 so that it moves in the first direction and a control device 50.

When the laser machining apparatus 1 is provided in a three-dimensional coordinate system formed by an X-axis, a Y-axis, and a Z-axis, the X-axis direction is the first direction and the Y-axis direction is the second direction. The X-axis direction and the Y-axis direction are orthogonal to each other. The direction orthogonal to the X-axis direction and to the Y-axis direction is the Z-axis direction. In the first embodiment, while the second direction is orthogonal to the first direction, i.e., the second direction crosses the first direction at 90 degrees, the second direction can be at any angle as long as it intersects the first direction. Therefore, the angle formed by the second direction and the first direction does not have to be 90 degrees. In the following descriptions, the first direction is referred to as "X direction" where appropriate, and the second direction is referred to as "Y direction" where appropriate.

In the first embodiment, the optical-scanning laser machining device 10 includes the machining head 11, a cross rail 12, and a pair of cross-rail guiding members 13, 13. The cross rail 12 extends in the Y direction. The pair of cross-rail guiding members 13, 13 extends in the X direction. The pair of cross-rail guiding members 13, 13 is attached to a pair of bases 14, 14. The cross rail 12 is supported by the pair of cross-rail guiding members 13, 13 and moves in the X direction while being guided by the pair of cross-rail guiding members 13, 13. In this manner, the cross rail 12 is supported by the pair of cross-rail guiding members 13, 13 with a both-sided holding structure. The support structure of the cross rail 12 is not limited to a both-sided holding structure and can be a one-sided holding structure. The pair of cross-rail guiding members 13, 13 is provided on both sides of the pair of pallet transporting rails 41, 41, which extends in the X direction, in the X direction. The cross rail 12 is provided above the pair of pallet transporting rails 41, 41.

The pallet 40 is a table on which the workpiece 2 to be machined by the optical-scanning laser machining device 10 is loaded. The pallet 40 is supported by the pair of palette transporting rails 41, 41. The pallet 40 moves in the X direction between the first marking device 20 and the second marking device 30 while being guided by the pair of pallet transporting rails 41, 41. In this manner, the pallet transporting rails 41, 41 are used to move the pallet 40 in the X direction. When the pallet 40 passes the position of the optical-scanning laser machining device 10, the pallet 40 passes under the cross rail 12.

The machining head 11 is attached to the cross rail 12. The machining head 11 moves in the Y direction while being guided by the cross rail 12. The machining head 11 moves in the X direction with the cross rail 12 when the cross rail 12 moves in the X direction along the pair of cross-rail guiding members 13, 13. When the pallet 40 reaches a position under the cross rail 12, the machining head 11 is located over the pallet 40. Accordingly, the machining head 11 can move in both the X direction and the Y direction. With this configuration, the machining head 11 can move in both the X direction and the Y direction over the pallet 40.

The machining head 11 performs laser machining on the workpiece 2 by irradiating the workpiece 2 loaded on the pallet 40 with the laser light emitted from a laser oscillator 15. Cutting and punching are exemplified as laser machining. When the workpiece 2 is machined, the machining head 11 machines the workpiece 2 by irradiating the workpiece 2 with laser light while moving the workpiece 2 in at least one of the X direction and the Y direction within the XY plane in the three-dimensional (X, Y, Z) coordinate system, in a state where the pallet 40 is static, i.e., the workpiece 2 is static. That is, the optical-scanning laser machining device 10 is a machining device that machines the workpiece 2 while laser light is scanning the workpiece 2 within the XY plane.

In the first embodiment, the distance that the machining head 11 can move is longer in the X direction than in the Y direction. Therefore, the optical-scanning laser machining device 10 has a configuration such that the size thereof in the X direction is larger than that in the Y direction. Accordingly, in the optical-scanning laser machining device 10, the X direction is the longitudinal direction thereof and the Y direction is the lateral direction thereof. The pallet 40 moves along the longitudinal direction of the optical-scanning laser machining device 10.

The distance that the machining head 11 can move can be longer in the Y direction than in the X direction. In this case, the optical-scanning laser machining device 10 has a larger size in the Y direction than in the X direction, and the X direction is the lateral direction thereof and the Y direction is the longitudinal direction thereof. In this case, the pallet 40 moves along the X direction, i.e., along the lateral direction of the optical-scanning laser machining device 10.

As illustrated in FIG. 1, the first marking device 20 and the second marking device 30 are provided separately and independently from the optical-scanning laser machining device 10 and are on either side of the optical-scanning laser machining device 10 in the X direction, i.e., in the longitudinal direction. The first marking device 20 is provided on one side of the optical-scanning laser machining device 10 in the X direction. In the three-dimensional (X, Y, Z) coordinate system illustrated in FIG. 1, the first marking device 20 is provided on the −X direction side of the optical-scanning laser machining device 10. The second marking device 30 is provided on the other side of the optical-scanning laser machining device 10 in the X direction. In the three-dimensional (X, Y, Z) coordinate system illustrated in FIG. 1, the second marking device 30 is provided on the +X direction side of the optical-scanning laser machining device 10.

The first marking device 20 includes a print head 21 that prints a mark MK on the workpiece 2, a cross rail 22 that supports the print head 21 and causes the print head 21 to move in the Y direction, and a pair of cross-rail guiding members 23, 23 that extends in the X direction and supports the cross rail 22. The second marking device 30 includes a print head 31 that prints the mark MK on the workpiece 2, a cross rail 32 that supports the print head 31 and causes the print head 21 to move in the Y direction, and a pair of cross-rail guiding members 33, 33 that extends in the X direction and supports the cross rail 32.

The print head 21 of the first marking device 20 and the print head 31 of the second marking device 30 put the mark MK on the workpiece 2. An example of the mark MK is the part number of the machined product, into which the workpiece 2 is machined. In the first embodiment, printing the mark MK on the workpiece 2 is equivalent to putting the mark MK on the workpiece 2. The printing includes, other than drawing letters, drawing patterns or pictures. The print heads 21 and 31 put the mark MK on the workpiece 2 using laser light, an ink jet, pens, dots, or powder as a printing means. The printing means of the print heads 21 and 31 is not limited to the above examples. Because the first marking device 20 and the second marking device 30 are controlled and provided independently from the optical-scanning laser machining device 10, the mark MK can be printed on the workpiece 2 regardless of the operating state of the optical-scanning laser machining device 10.

The pair of cross-rail guiding members 23, 23 of the first marking device 20 is provided on one side of the pair of pallet transporting rails 41, 41. The cross rail 22 and the print head 21 are supported by the pair of cross-rail guiding members 23, 23 provided on one side of the pair of pallet transporting rails 41, 41 so as to have a one-sided holding structure. The cross rail 22 and the print head 21 supported by the cross rail 22 move over the pallet 40 that is supported by the pair of pallet transporting rails 41, 41. The cross rail 22 moves in the X direction and causes the print head 21 to move in the Y direction; therefore, the print head 21 can move over the pallet 40 in both the X direction and the Y direction. With this configuration, the print head 21 can print a mark on an arbitrary position of the workpiece 2 loaded on the pallet 40.

The pair of cross-rail guiding members 33, 33 of the second marking device 30 is provided on one side of the pair of pallet transporting rails 41, 41. The cross rail 32 and the print head 31 are supported by the pair of cross-rail guiding members 33, 33 provided on one side of the pair of pallet transporting rails 41, 41 so as to have a one-sided holding structure. The cross rail 32 and the print head 31 supported by the cross rail 32 move over the pallet 40 that is supported by the pair of pallet transporting rails 41, 41. The cross rail 32 moves in the X direction and causes the print head 31 to move in the Y direction; therefore, the print head 31 can move over the pallet 40 in both the X direction and the Y direction. With this configuration, the print head 31 can print a mark on an arbitrary position of the workpiece 2 loaded on the pallet 40.

The support structure of the cross rail 22 and the print head 21 of the first marking device 20 and the support structure of the cross rail 32 and the print head 31 of the second marking device 30 are not limited to a one-sided holding structure. For example, the support structure described above can be a both-sided holding structure in which these cross rails and print heads are supported by a pair of guiding members provided on both sides of the pair of pallet transporting rails 41, 41.

The control device 50 controls the laser machining apparatus 1. More specifically, the control device 50 controls the operations of the optical-scanning laser machining device 10, the operations of the first marking device 20, the operations of the second marking device 30, and the operations of the pallet 40. The control device 50 includes a processing unit 50C and a storage unit 50M. The storage unit 50M stores therein a computer program PM that controls the laser machining apparatus 1. The storage unit 50M also stores therein machining data on the workpiece 2 and information on the part number to be put on the workpiece 2. The processing unit 50C reads the computer program PM from the storage unit 50M and performs various processes to control the laser machining apparatus 1.

The laser machining apparatus 1 includes a first operating panel 51 and a second operating panel 52. The first operating panel 51 includes an input device that operates the first marking device 20. The second operating panel 52 includes an input device that operates the second marking device 30. The first operating panel 51 and the second operating panel 52 each include a control device that includes a storage unit, and information can be stored in the storage unit. The operator of the laser machining apparatus 1 inputs a command to operate the first marking device 20 or the second marking device 30 to the control device 50 from the first operating panel 51 or the second operating panel 52, thereby operating the first marking device 20 or the second marking device 30. At least one of the storage units of the first operating panel 51 and the second operating panel 52 can store therein the information on the part number put on the workpiece 2 described above.

Figures 2, 3:
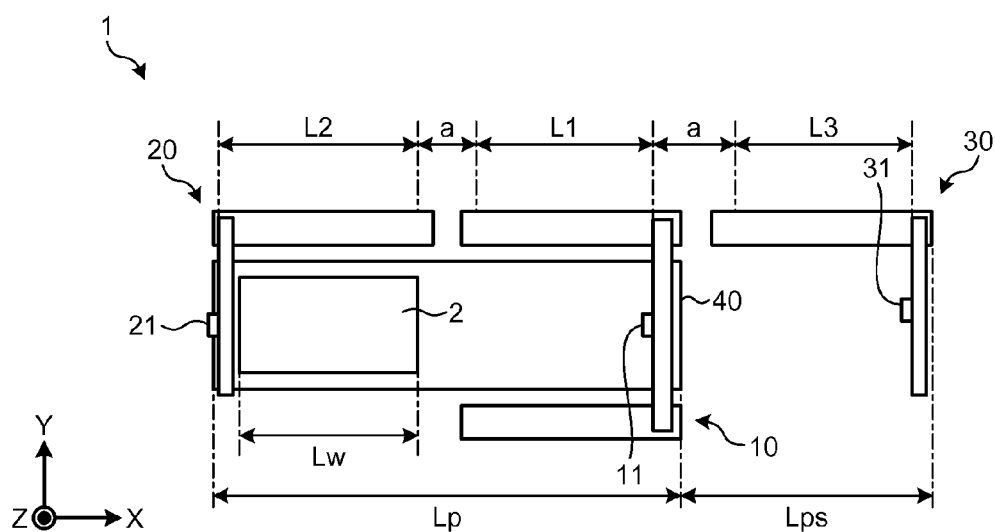
FIG. 2 is a plan view of the laser machining apparatus according to the first embodiment.
FIG. 3 is a plan view of the laser machining apparatus according to the first embodiment.

FIG. 2 is a plan view of the laser machining apparatus according to the first embodiment. The size of the pallet 40, the movable range of the machining head 11, the movable ranges of the print head 21 and the print head 31 are described with reference to FIG. 2. The size of the pallet 40 in the X direction is designated as Lp, the size of the workpiece 2 in the X direction is designated as Lw, the movable range of the machining head 11 in the X direction is designated as L1, the movable range of the print head 21 in the X direction is designated as L2, and the movable range of the print head 31 in the X direction is designated as L3. The movable range L1 of the machining head 11 in the X direction, the movable range L2 of the print head 21 in the X direction, and the movable range L3 of the print head 31 in the X direction are also referred to as "stroke".

It is preferable that the size Lp of the pallet 40 is equal to or larger than the sum of the movable range L1 of the machining head 11 and the movable range L2 of the print head 21 of the first marking device 20, or is equal to or larger than the sum of the movable range L1 of the machining head 11 and the movable range L3 of the print head 31 of the second marking device 30. That is, it is preferable that the size Lp of the pallet 40 is equal to or larger than L1+L2 or L1+L3. With this configuration, it becomes easier to load two workpieces 2 on the pallet 40 aligned in the X direction, machine one of the two workpieces 2 by the machining head 11, and perform printing on the other of the two workpieces 2 by the print head 21 of the first marking device 20 or the print head 31 of the second marking device 30.

As illustrated in FIG. 2, the distance when the print head 21 of the first marking device 20 and the machining head 11 are closest to each other and the distance when the print head 31 of the second marking device 30 and the machining head 11 are closest to each other are designated as 'a'. The distance 'a' is a distance between the optical-scanning laser machining device 10 and the first marking device 20 and a distance between the optical-scanning laser machining device 10 and the second marking device 30. In the following descriptions, the distance 'a' is referred to as an "inter-device distance 'a'" where appropriate.

It is more preferable that the size Lp of the pallet 40 is set to be equal to or larger than the value obtained by adding the inter-device distance 'a' to L1+L2 or equal to or larger than the value obtained by adding the inter-device distance 'a' to L1+L3. With this configuration, even if the optical-scanning laser machining device 10 is far from the first marking device 20 and the second marking device 30, when two workpieces 2 loaded on the pallet 40 to be aligned in the X direction are machined and printed, the machining head 11 can machine the workpieces 2 while moving in all the movable ranges without moving the pallet 40. Furthermore, the print head 21 and the print head 31 can print the mark MK on the workpieces 2 while moving in all the movable ranges without moving the pallet 40.

When a movable range Lps of the pallet 40 in the X direction is large, the size Lp of the pallet 40 can be increased corresponding to the movable range Lps. However, when the movable range Lps is increased, the size of the laser machining apparatus 1 in the X direction increases; therefore, there are restrictions on the installation space of the laser machining apparatus 1. Accordingly, it is preferable that the size Lp of the pallet 40 is set to be equal to or smaller than the value obtained by adding double the inter-device distance 'a' to L1+L2 or equal to or smaller than the value obtained by adding double the inter-device distance 'a' to L1+L3.

In the first embodiment, the movable range L1 of the machining head 11, the movable range L2 of the print head 21, and the movable range L3 of the print head 31 are the same as one another; however, the first embodiment is not limited thereto. It is also possible to set the movable range L1 of the machining head 11 to be the same as any one of the movable range L2 of the print head 21 and the movable range L3 of the print head 31. That is, it is possible to set the movable range L1 of the machining head 11 to be the same as at least one of the movable range L2 of the print head 21 and the movable range L3 of the print head 31. Further, all of the movable ranges L1, L2, and L3 can be different from one another.

It is also possible to set the movable range L2 of the print head 21 and the movable range L3 of the print head 31 to be the same and set the movable range L1 of the machining head 11 to be different from the movable range L2 and the movable range L3. In this case, by setting the movable range L2 of the print head 21 and the movable range L3 of the print head 31 to be smaller than the movable range L1 of the machining head 11, the size of the laser machining apparatus 1 in the X direction can be reduced. The movable range L2 of the print head 21 and the movable range L3 of the print head 31 can be equal to or larger than the movable range L1 of the machining head 11.

Figure 4:
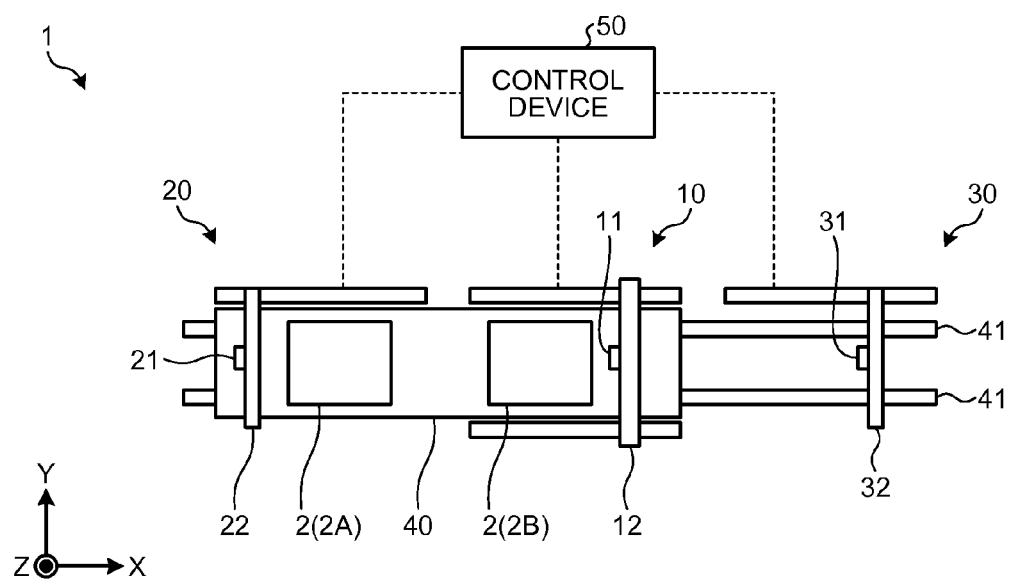
FIG. 4 is a plan view of the laser machining apparatus according to the first embodiment.

FIGS. 3 and 4 are plan views of the laser machining apparatus according to the first embodiment. FIGS. 3 and 4 illustrate a state where, when the pallet 40 is present in the movable range L1 of the machining head 11 of the optical-scanning laser machining device 10 and in the movable range L2 of the print head 21 of the first marking device 20, the workpiece 2 having a size in the X direction being equal to or smaller than the movable range L1 and the movable range L2 is loaded on the pallet 40. As illustrated in FIG. 3, while the optical-scanning laser machining device 10 is machining a workpiece 2B, the pallet 40 at the position of the first marking device 20 has no load on it; therefore, as illustrated in FIG. 4, the operator of the laser machining apparatus 1 can load a workpiece 2A that is to be machined next from the position of the first marking device 20 onto the pallet 40. Furthermore, while the control device 50 is causing the optical-scanning laser machining device 10 to machine the workpiece 2B, the control device 50 can cause the first marking device 20 to perform printing on the workpiece 2A that is loaded on the pallet 40. Further, the operator can remove the workpiece 2A that has been machined by the optical-scanning laser machining device 10 from the position of the first marking device 20.

In a case where two workpieces 2 are loaded on the pallet 40 to be aligned in the X direction and the size Lw of the workpiece 2 in the X direction is equal to or smaller than the movable range L1 of the machining head 11 in the X direction, in the laser machining apparatus 1, while the optical-scanning laser machining device 10 is machining one of the two workpieces 2, any one of the first marking device 20 and the second marking device 30 prints a mark on the other of the two workpieces 2. Next, an explanation will be given of an example of a procedure for machining the workpiece 2 using the laser machining apparatus 1 in a case where two workpieces 2 are loaded on the pallet 40 to be aligned in the X direction.

Figure 5:
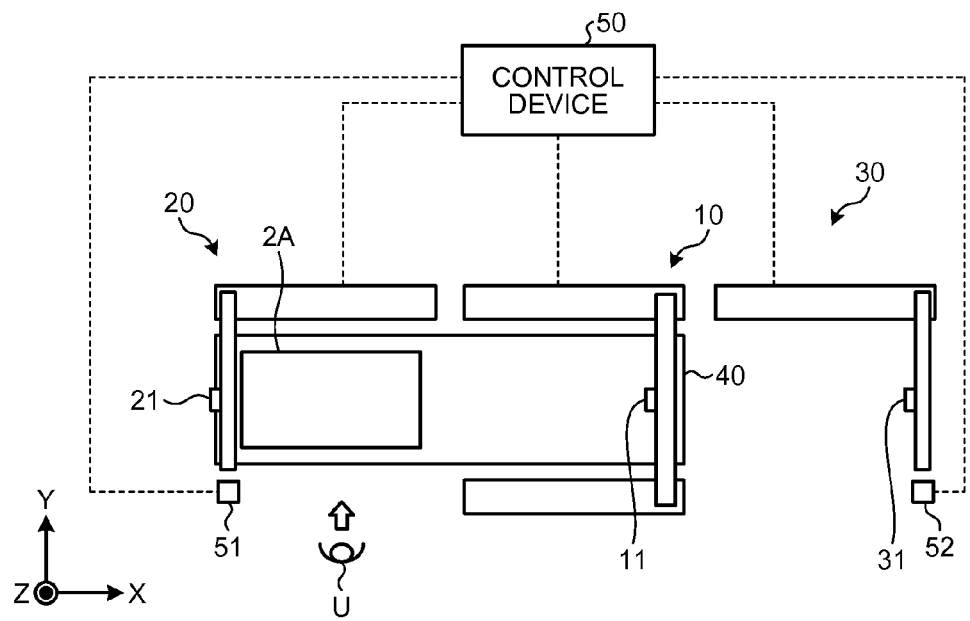
FIG. 5 is an explanatory diagram of a procedure when workpieces are machined using the laser machining apparatus according to the first embodiment.
Figure 6:
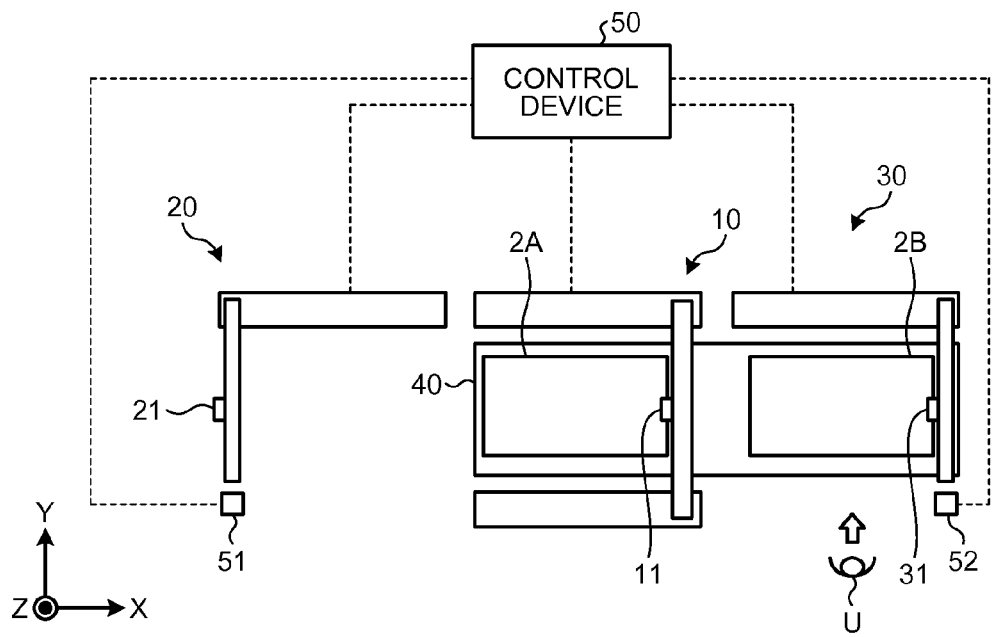
FIG. 6 is an explanatory diagram of a procedure when workpieces are machined using the laser machining apparatus according to the first embodiment.
Figure 7:
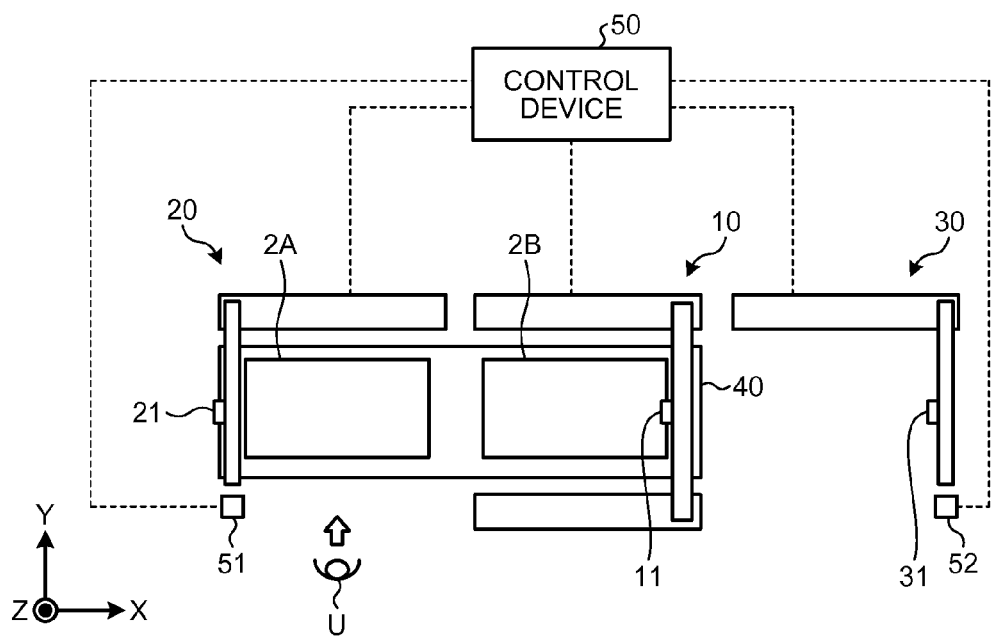
FIG. 7 is an explanatory diagram of a procedure when workpieces are machined using the laser machining apparatus according to the first embodiment.
Figure 8:
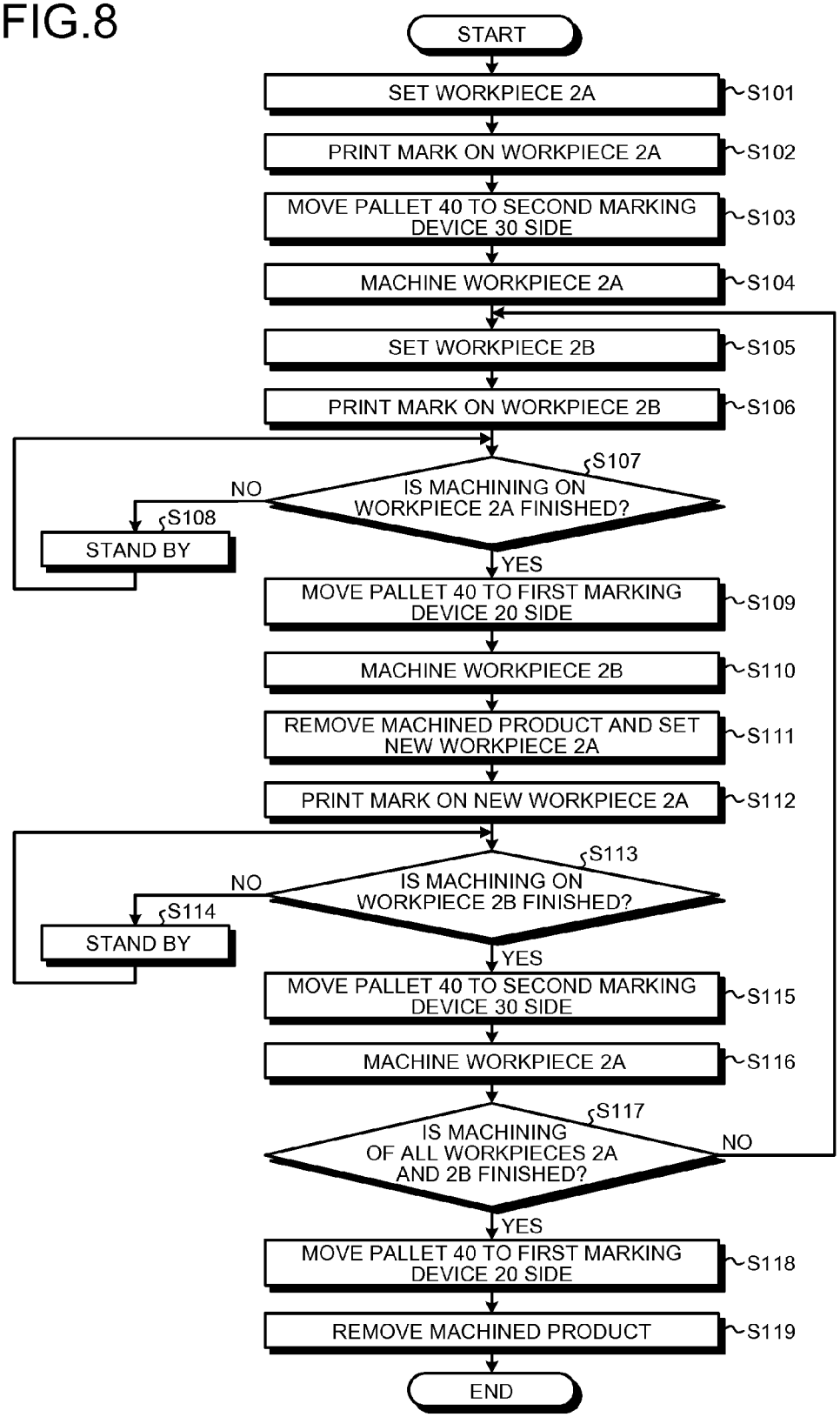
FIG. 8 is a flowchart illustrating a procedure when workpieces are machined using the laser machining apparatus according to the first embodiment.

FIGS. 5 to 7 are explanatory diagrams of a procedure when workpieces are machined using the laser machining apparatus according to the first embodiment. FIG. 8 is a flowchart illustrating a procedure when workpieces are machined using the laser machining apparatus according to the first embodiment. FIG. 6 illustrates an example in which the second marking device 30 prints a mark on the workpiece 2B while the optical-scanning laser machining device 10 is machining the workpiece 2A. FIG. 7 illustrates an example in which the first marking device 20 prints a mark on the workpiece 2A while the optical-scanning laser machining device 10 is machining the workpiece 2B.

At Step S101, as illustrated in FIG. 5, an operator U of the laser machining apparatus 1 sets the workpiece 2A on the pallet 40. Next, when the operator U operates the first operation panel 51, at Step S102, the control device 50 causes the print head 21 of the first marking device 20 to print a mark on the workpiece 2A.

When the printing is finished, the process proceeds to Step S103, and, as illustrated in FIG. 6, the control device 50 moves the pallet 40 to the second marking device 30 side. When the workpiece 2A loaded on the pallet 40 is moved to the position of the optical-scanning laser machining device 10, at Step S104, the control device 50 causes the machining head 11 of the optical-scanning laser machining device 10 to machine the workpiece 2A.

At Step S105, as illustrated in FIG. 6, the operator U sets the workpiece 2B on the pallet 40. Next, at Step S106, when the operator U operates the second operation panel 52, the print head 31 of the second marking device 30 prints a mark on the workpiece 2B. At this point, the optical-scanning laser machining device 10 is machining the workpiece 2A. When the printing of the mark on the workpiece 2B is finished, the process proceeds to Step S107, and the control device 50 determines whether the machining of the workpiece 2A is finished. When the machining of the workpiece 2A is not finished (NO at Step S107), at Step S108, the control device 50 causes the second marking device 30 to stand by until the machining of the workpiece 2A by the optical-scanning laser machining device 10 is finished.

When the machining of the workpiece 2A is finished (YES at Step S107), the process proceeds to Step S109, and the control device 50 moves the pallet 40 to the first marking device 20 side. With this process, as illustrated in FIG. 7, the workpiece 2B is moved to the position of the optical-scanning laser machining device 10, and the machined workpiece 2A is moved to the position of the first marking device 20. After the pallet 40 has moved to the first marking device 20 side, at Step S110, the control device 50 causes the machining head 11 of the optical-scanning laser machining device 10 to machine the workpiece 2B.

At Step S111, the operator U removes the machined product, i.e., the machined workpiece 2A, from the position of the first marking device 20, and sets a new workpiece 2A. When the setting of the new workpiece 2A is completed, the operator U operates the first operation panel 51. Subsequently, at Step S112, the control device 50 causes the print head 21 of the first marking device 20 to print a mark on the new workpiece 2A. At this point, the optical-scanning laser machining device 10 is machining the workpiece 2B.

Next, the process proceeds to Step S113, and the control device 50 determines whether the machining of the workpiece 2B is finished. When the machining of the workpiece 2B is not finished (NO at Step S113), at Step S114, the control device 50 causes the first marking device 20 to stand by until the machining of the workpiece 2B by the optical-scanning laser machining device 10 is finished.

When the machining of the workpiece 2B is finished (YES at Step S113), the process proceeds to Step S115, and the control device 50 moves the pallet 40 to the second marking device 30 side. The workpiece 2A is moved to the position of the optical-scanning laser machining device 10, and the machined workpiece 2B is moved to the position of the second marking device 30. After the pallet 40 has moved to the second marking device 30 side, at Step S116, the control device 50 causes the machining head 11 of the optical-scanning laser machining device 10 to machine the workpiece 2A.

Next, the process proceeds to Step S117, and the control device 50 determines whether the machining of all the workpieces 2A and 2B performed by the optical-scanning laser machining device 10 is finished. When there is the workpiece 2A or the workpiece 2B yet to be machined by the optical-scanning laser machining device 10 (NO at Step S117), the processes from Step S105 to Step S117 are performed. When there is none of the workpiece 2A and the workpiece 2B yet to be machined by the optical-scanning laser machining device 10 (YES at Step S117), at Step S118, the control device 50 moves the pallet 40 to the first marking device 20 side on the condition that the machining of the workpiece 2A is finished. At Step S119, the operator U removes the machined product, i.e., the machined workpiece 2A, from the position of the first marking device 20. When the machined workpiece 2A is removed, in a case where the two workpieces 2A and 2B are loaded on the pallet 40 to be aligned in the X direction, all the procedures for machining the workpieces 2A and 2B using the laser machining apparatus 1 are finished.

The procedures for machining the two workpieces 2A and 2B loaded on the pallet 40 to be aligned in the X direction are described as a laser machining method according to the first embodiment as described below.

The laser machining method according to the first embodiment includes a step of causing the first marking device 20 to put a mark on the workpiece 2A, which is a first workpiece (Step S102 or Step S112), a step of moving the pallet 40 toward the second marking device 30 (Step S103 or Step S115), a step of causing the machining head 11 to machine the workpiece 2A, which is the first workpiece (Step S104 or Step S116), a step of setting the workpiece 2B, which is a second workpiece, on the pallet 40 (Step S105), a step of causing the second marking device 30 to put a mark on the workpiece 2B, which is the second workpiece, after setting the workpiece 2B, which is the second workpiece, on the pallet 40 (Step S106), a step of moving the pallet 40 toward the first marking device 20, after finishing machining of the workpiece 2A, which is the first workpiece (Step S109 or Step S118), a step of causing the machining head 11 to machine the workpiece 2B, which is the second workpiece (Step S110), and a step of removing a product machined from the workpiece 2A, which is the first workpiece, and setting the workpiece 2A as a new first workpiece on the pallet 40 (Step S111).

With the laser machining method according to the first embodiment, while machining one of two workpieces 2 loaded on the pallet 40 to be aligned in the X direction, a mark can be put on the other of the workpieces 2; therefore, the productivity can be improved.

In the first embodiment, when two workpieces, i.e., the workpieces 2A and 2B, loaded on the pallet 40 to be aligned in the X direction are machined, the laser machining apparatus 1 prints a mark on the workpieces 2A and 2B before these workpieces are machined. In this manner, even when a machined product is moved by the assist gas injected together with a laser emitted from the machining head 11, because a mark is printed before the machined product is moved, misalignment of printing due to deviation of the position of the machined product can be suppressed. That is, movement of the machined product by the assist gas does not affect the printing. Printing a mark before machining the workpieces 2A and 2B is particularly effective when the mass of the machined product is small. Further, in the first embodiment, the laser machining apparatus 1 can omit Step S102 described above. That is, with regard to only the first workpiece 2A, it is possible to machine the workpiece 2A before a mark is printed thereon and then print a mark after the movement of the pallet 40 at Step S109. With this procedure, the processing time can be shortened for the period of time taken to print a mark at Step S102.

As described above, in the laser machining apparatus 1, the first marking device 20 and the second marking device 30 are provided on either side of the optical-scanning laser machining device 10 in the X direction. The first marking device 20 and the second marking device 30 are operated independently from each other and are operated independently from the optical-scanning laser machining device 10. With this configuration, while a mark is being printed on the workpiece 2, the laser machining apparatus 1 can perform operations such as performing machining by the optical-scanning laser machining device 10, removing a machined product from the laser machining apparatus 1, and loading and positioning the workpiece 2 to be machined next on the pallet 40; therefore, the productivity can be improved.

Because the first marking device 20 and the second marking device 30 included in the laser machining apparatus 1 are operated independently from the optical-scanning laser machining device 10, a mark can be printed on the workpiece 2 regardless of the operation of the optical-scanning laser machining device 10. As a result, in the laser machining apparatus 1, the machining range of the workpiece 2 and the range in which a mark is printed can be made equal, thereby relaxing limitations on the range in which a mark can be printed. Further, the laser machining apparatus 1 can be made compact.

In the first marking device 20 and the second marking device 30 included in the laser machining apparatus 1, the printing means thereof is not limited to laser light; therefore, there is also an advantage in that limitations on the type or usage of printing are looser. Further, it is also possible to configure the first marking device 20 and the second marking device 30 to include a plurality of printing means and print a mark on the workpiece 2 by switching between these printing means. With this configuration, there is an advantage in that an appropriate printing means can be selected according to the type of the workpiece 2 or the type of a machined product.

In the laser machining apparatus 1, the first marking device 20 and the second marking device 30 are provided on either side of the optical-scanning laser machining device 10 in the X direction. The pallet 40 on which the workpiece 2 is loaded moves along the pair of pallet transporting rails 41, 41 that connects the first marking device 20, the optical-scanning laser machining device 10, and the second marking device 30. With this configuration, the laser machining apparatus 1 can suppress an increase in size of the apparatus itself and the installation space thereof.

The first marking device 20, the optical-scanning laser machining device 10, and the second marking device 30 are aligned, and the pallet 40 moves along the pair of pallet transporting rails 41, 41 that extends linearly in the X direction. Further, because it suffices that the pallet 40 can move only in the X direction, only one device is required for driving the pallet 40. Accordingly, the laser machining apparatus 1 can be configured with a simple structure and can suppress an increase in manufacturing cost as well as labor and cost for maintenance.

In the laser machining apparatus 1, a device for printing a mark and a device for laser machining are not present on the same machining table. Accordingly, there is no limitation that the device for printing and the device for laser machining do not interfere with each other, and there is no limitation due to the route followed during printing and laser machining; therefore, the productivity is improved.

Second Embodiment

Figure 9:
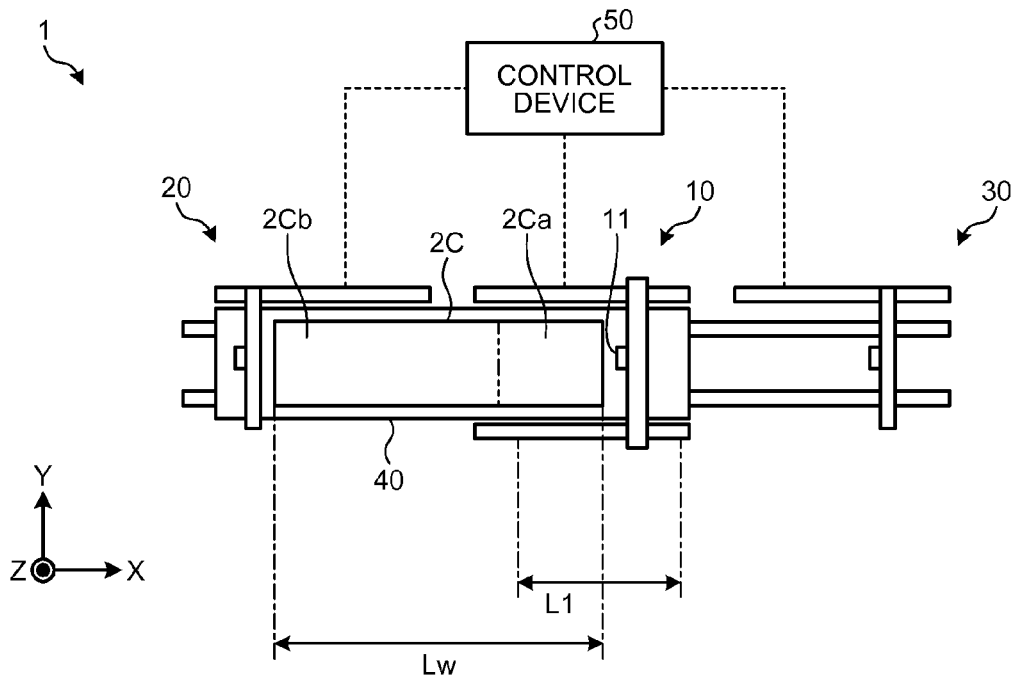
FIG. 9 is a diagram illustrating an example in which machining is performed on a workpiece exceeding a movable range in an X direction of a machining head included in an optical-scanning laser machining device.
Figure 10:
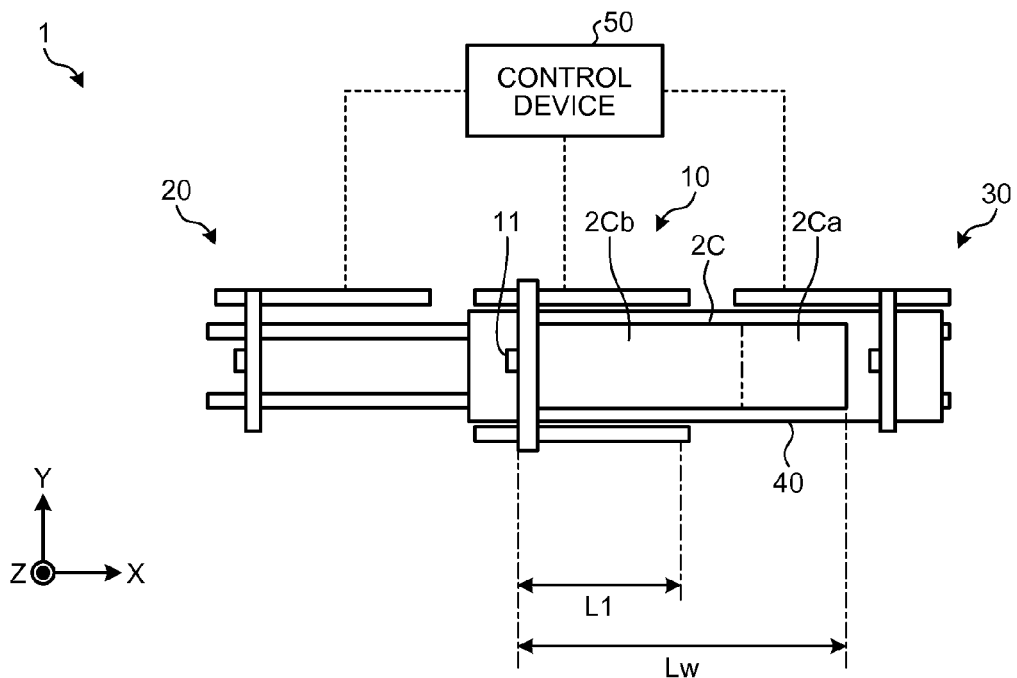
FIG. 10 is a diagram illustrating an example in which machining is performed on a workpiece exceeding a movable range in the X direction of the machining head included in the optical-scanning laser machining device.

FIGS. 9 and 10 are diagrams illustrating an example in which machining is performed on a workpiece exceeding a movable range in the X direction of the machining head included in the optical-scanning laser machining device. A second embodiment is an example of machining in which the size Lw in the X direction of a workpiece 2C loaded on the pallet 40 is larger than the movable range L1 of the machining head 11 in the X direction. In this case, as illustrated in FIG. 9, the machining head 11 of the optical-scanning laser machining device 10 machines a first region 2Ca, which is a region of a part of the workpiece 2C within the movable range L1 in the X direction. After this machining, the pallet 40 moves in the X direction as illustrated in FIG. 10, and a second region 2Cb, which is a region of the workpiece 2C that has been located outside the movable range L1, is moved to the inside of the movable range L1. Next, an explanation will be given of an example of a procedure in which the laser machining apparatus 1 machines the workpiece 2C exceeding the movable range L1 in the X direction of the machining head 11 included in the optical-scanning laser machining device 10.

Figure 11:
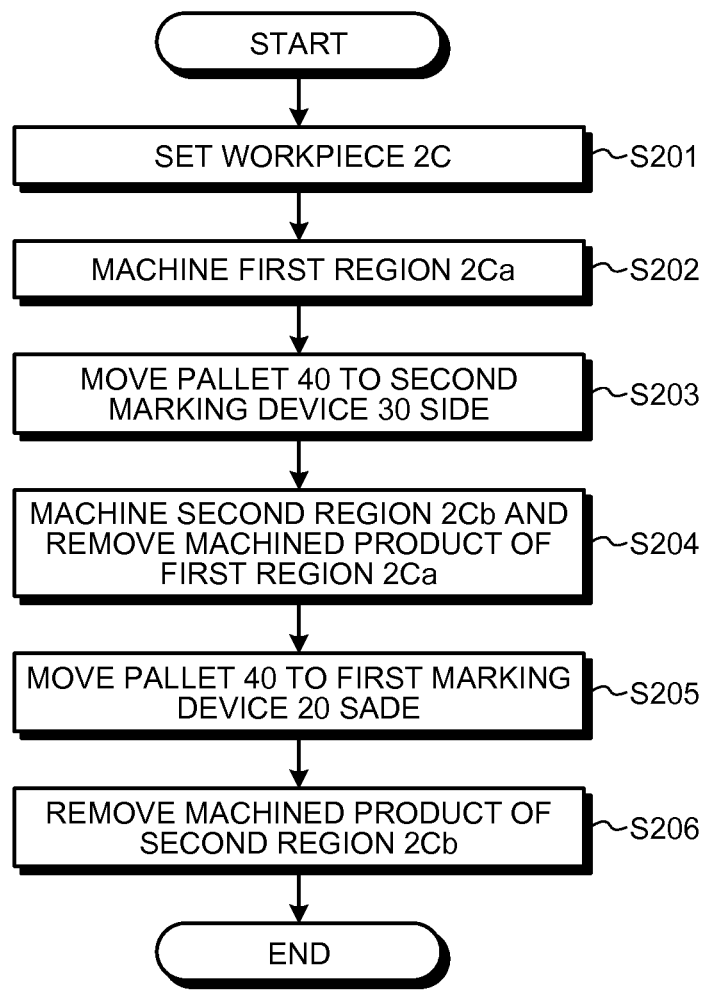
FIG. 11 is a flowchart illustrating a procedure in which machining is performed on a workpiece exceeding a movable range in the X direction of the machining head included in the optical-scanning laser machining device.

FIG. 11 is a flowchart illustrating a procedure in which machining is performed on a workpiece exceeding a movable range in the X direction of the machining head included in the optical-scanning laser machining device. At Step S201, the operator of the laser machining apparatus 1 sets the workpiece 2C on the pallet 40. Next, the process proceeds to Step S202, and the optical-scanning laser machining device 10 is controlled by the control device 50 such that the first region 2Ca of the workpiece 2C is machined using the machining head 11. The first region 2Ca is a region of the workpiece 2C loaded on the pallet 40 on the second marking device 30 side.

Next, the process proceeds to Step S203, and the pallet 40 is controlled by the control device 50 such that it moves to the second marking device 30 side. When the movement of the pallet 40 is completed, at Step S204, the optical-scanning laser machining device 10 is controlled by the control device 50 such that the second region 2Cb of the workpiece 2C is machined using the machining head 11. The second region 2Cb is a region of the workpiece 2C loaded on the pallet 40 on the first marking device 20 side. At Step S204, the operator removes the machined product of the first region 2Ca from the second marking device 30 side. In this manner, the machined product of the first region 2Ca is removed at the same time as the second region 2Cb is being machined; therefore, the operation efficiency is improved.

When the machining of the second region 2Cb is finished, at Step S205, the pallet 40 is controlled by the control device 50 such that it moves to the first marking device 20 side. Next, at Step S206, the operator removes the machined product of the second region 2Cb from the first marking device 20 side. When the machined product of the second region 2Cb is removed, the laser machining apparatus 1 finishes all the procedures for machining the workpiece 2C exceeding the movable range L1 in the X direction of the machining head 11.

In the second embodiment, while it has been described that the pallet 40 moves from the first marking device 20 toward the second marking device 30, the pallet 40 can also move from the second marking device 30 toward the first marking device 20. In this case, the machining head 11 of the optical-scanning laser machining device 10 moves from the first marking device 20 side toward the second marking device 30 side.

In the second embodiment, because the pallet 40 can move to both sides of the optical-scanning laser machining device 10 in the X direction, machining can be performed even on the workpiece 2C, which has a size exceeding the movable range L1 in the X direction of the machining head 11. The laser machining apparatus 1 can be configured to include the first marking device 20 and the second marking device 30 provided on either side of the optical-scanning laser machining device 10 in the X direction. Thus, the laser machining apparatus 1 can be configured with a simple structure; therefore, the production costs can be suppressed. Further, when the workpiece 2C exceeding the movable range L1 in the X direction of the machining head 11 is machined, the laser machining apparatus 1 can suppress an increase in the installation range thereof.

As illustrated in FIG. 9, the laser machining apparatus 1 can start machining in a state where the machining head 11 is provided on the outer side of the end part of the workpiece 2C on the optical-scanning laser machining device 10 side, move the pallet 40 to the second marking device 30 side, and move the machining head 11 to the first marking device 20 side. With this configuration, the workpiece 2C exceeding the movable range L1 in the X direction of the machining head 11 can be cut in the longitudinal direction thereof, i.e., in the X direction.

Modification of Second Embodiment

Figure 12:
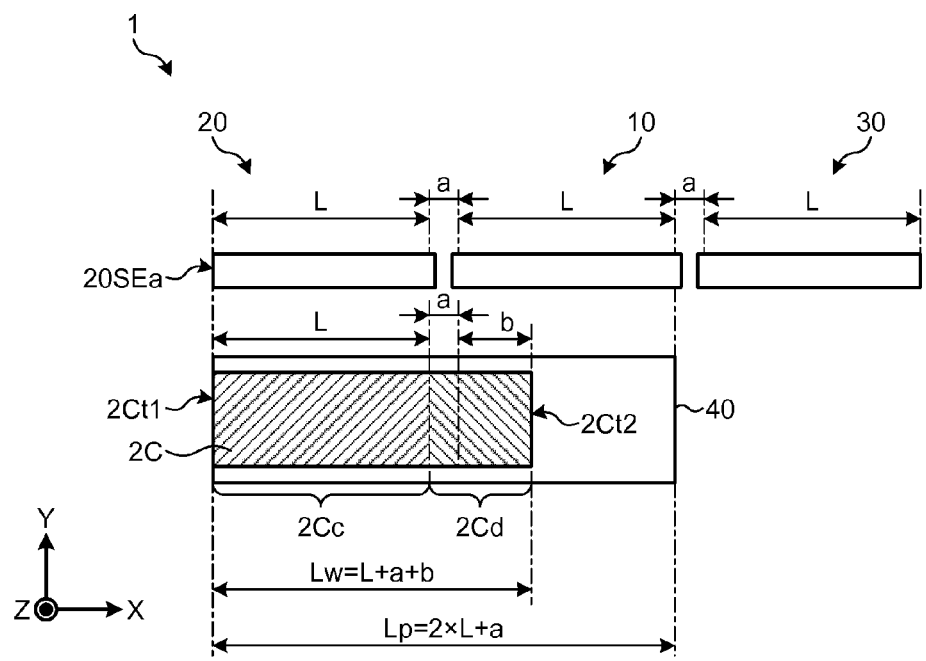
FIG. 12 is an explanatory diagram of a modification of a second embodiment.
Figure 13:
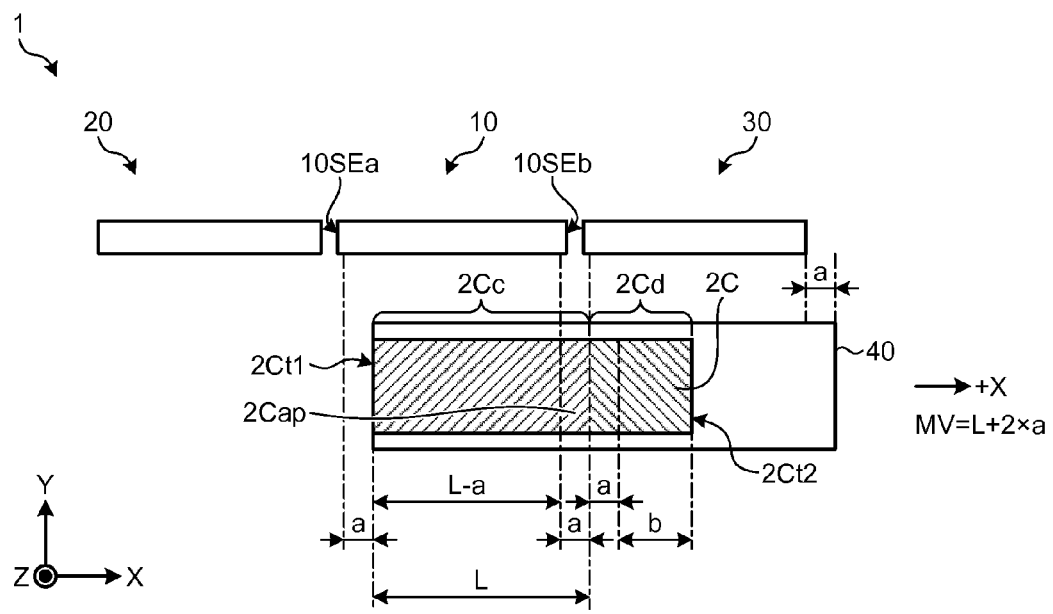
FIG. 13 is an explanatory diagram of the modification of the second embodiment.
Figure 14:
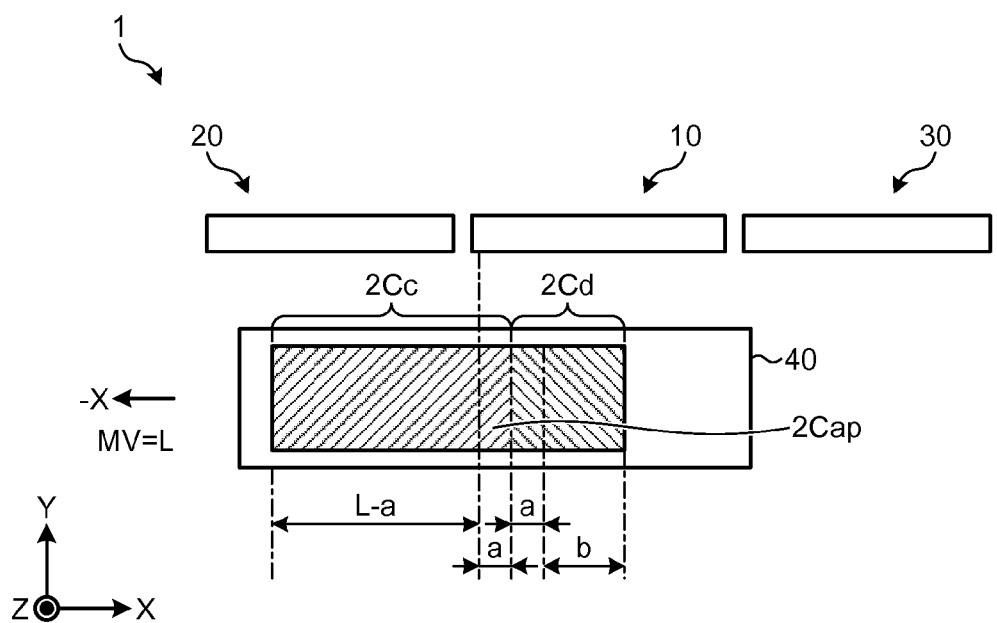
FIG. 14 is an explanatory diagram of the modification of the second embodiment.

FIGS. 12 to 14 are explanatory diagram of a modification of the second embodiment. In FIGS. 12 to 14, the machining head 11 of the optical-scanning laser machining device 10, the print head 21 of the first marking device 20, the print head 31 of the second marking device 30, and the control device 50 are omitted. The present modification is an example in which the workpiece 2C exceeding the movable range in the X direction of the machining head 11 is machined while a mark is put on the workpiece 2C. The movable range of the machining head 11 in the X direction, the movable range of the print head 21 in the X direction, and the movable range of the print head 31 in the X direction are the same as one another and represented as L. The movable range L represents a length or a distance. In the following descriptions, the movable range L is also referred to as "length L" or "distance L" where appropriate. As described above, 'a' is an inter-device distance, and in the following descriptions, it is also referred to as "length 'a'" or "distance 'a'" where appropriate. The size Lw of the workpiece 2C loaded on the pallet 40 in the X direction is L+a+b, and the size Lw is larger than the movable range L of the machining head 11. The size Lp of the pallet 40 in the X direction is 2×L+a.

As illustrated in FIG. 12, the workpiece 2C is loaded on the pallet 40 with the pallet 40 being in a state of having moved to the first marking device 20 side. A part of the workpiece 2C is within the movable range L of the machining head 11 in a state where the pallet 40 has moved to the first marking device 20 side. As for the workpiece 2C in the X direction, the range with the length L from one end part 2Ct1 is designated as a first region 2Cc, and the range with a length a+b from the other end part 2Ct2 is designated as a second region 2Cd.

When the pallet 40 is in a state of having moved to the first marking device 20 side, the first region 2Cc is within the movable range L of the print head 21 of the first marking device 20 and a part of the second region 2Cd is within the movable range L of the machining head 11. In this state, the first marking device 20 prints a mark in the first region 2Cc of the workpiece 2C.

When the printing by the first marking device 20 is finished, as illustrated in FIG. 13, the pallet 40 moves in the +X direction, i.e., moves to the second marking device 30 side. In this case, a moving distance MV of the pallet 40 is L+2×a. As illustrated in FIG. 12, in a state where the pallet 40 has moved to the first marking device 20 side, the one end part 2Ct1 of the workpiece 2C loaded on the pallet 40 is at the same position as a first terminal part 20SEa of the movable range L of the print head 21 included in the first marking device 20. Accordingly, as illustrated in FIG. 13, after the movement of the pallet 40, the one end part 2Ct1 of the workpiece 2C is at a position that is the length 'a' towards a second terminal part 10SEb from a first terminal part 10SEa of the movable range L of the machining head 11 included in the optical-scanning laser machining device 10.

After the movement of the pallet 40, as illustrated in FIG. 13, a part of the first region 2Cc of the workpiece 2C having a mark put thereon is located between the optical-scanning laser machining device 10 and the second marking device 30. Parts other than a part 2Cap of the first region 2Cc are located within the movable range L of the machining head 11 included in the optical-scanning laser machining device 10. The second region 2Cd of the workpiece 2C is located within the movable range L of the print head 31 included in the second marking device 30. In this state, the optical-scanning laser machining device 10 machines a part of the first region 2Cc of the workpiece 2C, and the second marking device 30 prints a mark in the second region 2Cd of the workpiece 2C. In the first region 2Cc, the part with a length L-a is machined from the one end part 2Ct1 of the workpiece 2C toward the other end part 2Ct2 by the optical-scanning laser machining device 10. The part 2Cap of the first region 2Cc is an unmachined part. The unmachined part is the part from the length L-a to the length L, starting from the one end part 2Ct1 of the workpiece 2C.

When the machining and printing on the workpiece 2C is finished, as illustrated in FIG. 14, the pallet 40 moves in the −X direction, i.e., moves to the first marking device 20 side. The moving distance MV is L. As the pallet 40 moves to the first marking device 20 side, the second region 2Cd and the unmachined part of the first region 2Cc, which is the part 2Cap of the first region 2Cc, are located within the movable range L of the machining head 11 included in the optical-scanning laser machining device 10. The machined part of the first region 2Cc of the workpiece 2C is located outside the movable part L of the machining head 11 included in the optical-scanning laser machining device 10.

In this state, the optical-scanning laser machining device 10 machines the second region 2Cd and the unmachined part of the first region 2Cc. The machined part of the first region 2Cc of the workpiece 2C is removed from the first marking device 20 side. When the machining of the second region 2Cd and the part 2Cap of the first region 2Cc is finished, the pallet 40 moves in the +X direction, i.e., moves to the second marking device 30 side. The machined second region 2Cd and the machined part 2Cap of the first region 2Cc are removed from the second marking device 30 side.

Even when the size Lw of the workpiece 2C in the X direction exceeds the movable range in the X direction of the machining head 11, the laser machining apparatus 1 can put a mark on a part of the workpiece 2C while machining another part of the workpiece 2C, and the machined workpiece 2C can be removed from the laser machining apparatus 1 while machining a part of the workpiece 2C. Accordingly, the laser machining apparatus 1 can improve the productivity when the workpiece 2C having a size exceeding the movable range in the X direction of the machining head 11 is machined.

As described above, in the laser machining apparatus 1, the size of the pallet 40 in the X direction can be made larger than the movable range in the X direction of the machining head 11 included in the optical-scanning laser machining device 10. Accordingly, the laser machining apparatus 1 can machine the workpiece 2C that is larger than the movable range in the X direction of the machining head 11 without including a dual-structured workpiece-moving device. Therefore, in the laser machining apparatus 1, because no special data for providing a dual-structured workpiece-moving device is required, there is an advantage in that control executed by the laser machining apparatus 1 is facilitated. Further, because the pallet 40 and the pair of pallet transporting rails 41, 41 function as the moving device of the workpiece 2C and no other elements are required for the moving device, the laser machining apparatus 1 can be configured with a simple structure; therefore, the production costs can be suppressed.

The configuration described in the above embodiments are only an example of the content of the present invention, and the configuration can be combined with other well-known techniques, and the present invention can be configured while modifying or omitting a part of the configuration without departing from the scope of the invention.

REFERENCE SIGNS LIST

1 laser machining apparatus, 2, 2A, 2B workpiece, 10 optical-scanning laser machining device, 11 machining head, 12 cross rail, 20 first marking device, 21 print head, 22 cross rail, 30 second marking device, 31 print head, 32 cross rail, 40 pallet, 41 pallet transporting rail, 50 control device, L movable range (distance), L1, L2, L3, Lps movable range, MK mark.

The invention claimed is:

1. A laser machining apparatus comprising:
    an optical-scanning laser machining device that includes a machining head, which moves in a first direction and a second direction intersecting the first direction and emits laser light on a workpiece to machine the workpiece;
    a first marking head that is provided on one side of the optical-scanning laser machining device in the first direction and puts a mark on the workpiece;
    a second marking head that is provided on another side of the optical-scanning laser machining device in the first direction and puts a mark on the workpiece; and
    a pallet on which the workpiece to be machined by the optical-scanning laser machining device is loaded and which moves in the first direction between the first marking head and the second marking head,
    wherein the first marking head and the second marking head are provided on a different machining table than the optical-scanning laser machining device.

2. The laser machining apparatus according to claim 1, wherein a size of the pallet in the first direction is larger than a sum of a movable range of the machining head in the first direction and a movable range of the first marking head in the first direction or is equal to or larger than a sum of a movable range of the machining head in the first direction and a movable range of the second marking head in the first direction.

3. The laser machining apparatus according to claim 1, wherein a movable range of the machining head in the first direction is same as at least one of a movable range of the first marking head in the first direction and a movable range of the second marking head in the first direction.

4. The laser machining apparatus according to claim 1, wherein when two workpieces are loaded on the pallet to be aligned in the first direction and a plurality of workpieces each having a size in the first direction that is equal to or smaller than a movable range of the machining head in the first direction are machined, any one of the first marking head and the second marking head puts a mark on one of the workpieces while the optical-scanning laser machining device is machining another of the workpieces.

5. The laser machining apparatus according to claim 1, wherein when a size of the workpiece loaded on the pallet in the first direction is larger than a movable range of the machining head in the first direction, after the machining head machines a partial region of the workpiece within the movable range of the machining head in the first direction, the pallet moves in the first direction such that a region of the workpiece that has been located outside the movable range of the machining head is moved to an inside of the movable range of the machining head.

6. The laser machining apparatus according to claim 1, further comprising a controller that controls the optical-scanning laser machining device, the first marking head, and the second marking head, wherein
    when a plurality of workpieces each having a size in the first direction that is equal to or smaller than a movable range of the machining head in the first direction are machined,
    the controller;
        causes the first marking head to put a mark on a first workpiece,
        moves the pallet toward the second marking head,
        causes the machining head to machine the first workpiece and the second marking head to put a mark on a second workpiece,
        moves the pallet toward the first marking head, and
        causes the machining head to machine the second workpiece.

* * * * *